(12) United States Patent
Zaslavsky et al.

(10) Patent No.: US 10,817,497 B2
(45) Date of Patent: Oct. 27, 2020

(54) MIGRATION FLOW CONTROL

(71) Applicant: salesforce.com, inc., San Francisco, CA (US)

(72) Inventors: Ilya Zaslavsky, Toronto (CA); Mikhail Chainani, San Francisco, CA (US); Alex Ovesea, Maple (CA); Vijayanth Devadhar, Fremont, CA (US); Xiaodan Wang, Dublin, CA (US); Alan Arbizu, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 426 days.

(21) Appl. No.: 15/882,266

(22) Filed: Jan. 29, 2018

(65) Prior Publication Data

US 2019/0236150 A1    Aug. 1, 2019

(51) Int. Cl.
| | |
|---|---|
| *G06F 16/00* | (2019.01) |
| *G06F 16/23* | (2019.01) |
| *G06F 9/455* | (2018.01) |
| *G06F 16/21* | (2019.01) |
| *G06F 16/27* | (2019.01) |

(52) U.S. Cl.
CPC ...... *G06F 16/2308* (2019.01); *G06F 9/45558* (2013.01); *G06F 16/214* (2019.01); *G06F 16/27* (2019.01); *G06F 2009/4557* (2013.01)

(58) Field of Classification Search
CPC .... G06F 16/214; G06F 16/2308; G06F 16/27; G06F 2009/4557; G06F 9/45558
See application file for complete search history.

(56) References Cited

U.S. PATENT DOCUMENTS

| | | | |
|---|---|---|---|
| 10,084,866 B1* | 9/2018 | Yamanoha | H04L 47/2441 |
| 10,432,548 B2* | 10/2019 | Kollur | H04L 47/70 |
| 2016/0147575 A1* | 5/2016 | Singh | G06F 9/5088 718/105 |
| 2018/0270305 A1* | 9/2018 | Tignor | H04L 67/327 |

* cited by examiner

*Primary Examiner* — Diedra McQuitery
(74) *Attorney, Agent, or Firm* — Wong & Rees LLP; Zhichong Gu

(57) ABSTRACT

Migration specific action requests to perform a set of migration specific actions are sent from a source system instance to a target system instance. Migration specific action responses are received from the target system instance. Based on the migration specific action responses, traffic lights for resource utilization of the target system instance are determined. Based on the traffic lights, a concurrency limit is determined for the specific time. The concurrency limit is applied to scale a total number of ongoing migration specific actions to be requested of the target system instance at the specific time.

24 Claims, 8 Drawing Sheets

```
BACK_OFF_FACTOR (BOF) < 1 < SLOW_SCALE_FACTOR( SSF ) < RAPID_SCALE_FACTOR ( RSF )

if traffic light is RED
    concurrencyControllerThreads = BOF * concurrencyControllerThreads
else if traffic light is YELLOW
    concurrencyControllerThreads = SSF * concurrencyControllerThreads
else # if traffic light is GREEN
    concurrencyControllerThreads = RSF * concurrencyControllerThreads
```

FIG. 3A

```
# for RED with BOF as scaling factor
if instance level traffic light is RED
    use (destInstanceDbId) concurrency key
    if last throttle was an instance level traffic light
        instanceLevelThreads = BOF * instanceLevelThreads
    else #last throttle was a node level traffic light
        instanceLevelThreads = BOF * sum(nodeLevelThreads) # or another aggregate function
else if node level traffic light is RED
    use (destInstanceDbId, dataPartitionId) concurrency key
    if last throttle was a node level traffic light
        nodeLevelThreads = BOF * nodeLevelThreads
    else #last throttle was an instance level traffic light
        nodeLevelThreads = BOF * (instanceLevelThreads / 32) # or another total
                                                              # number of partitions repeat for YELLOW with SSF as scaling factor and GREEN with RSF
```

FIG. 3B

```
If any traffic light is RED
    #throttle node threads first
    if node level traffic light is RED
        concurrencyControllerThreads = BOF * concurrencyControllerThreads
        # after the node is throttled (or not) compute the number of threads to drop for
        # instance level traffic light control and drop them equally amongst all
        # partitions if instance level traffic light is RED
        maxThreads = BOF * totalThreadLimit
        threadsToFree = sum(concurrencyControllerThreads) – maxThreads
        threadsToFreePerPartition = threadsToFree/partitions
        concurrencyControllerThreads -= threadsToFreePerPartition repeat for YELLOW scale all partitions up for GREEN
```

FIG. 3C

MIGRATION FLOW CONTROL

TECHNICAL FIELD

The present invention relates generally to organization migrations, and in particular, to flow or congestion control for migrating application data and application services of organizations between computing system instances.

BACKGROUND

A large-scale cloud-based computer system may include multiple datacenters at various geographic locations to maintain millions of sets of application data for millions of organizations as well as provide millions of sets of application services such as those for customer relationship management (CRM), secured data access, online transaction processing, mobile apps, etc., to respective users and/or customers of these organizations.

As the datacenters evolve over time, and as computing resource needs for the organizations evolve over time, at least some of the organizations may be relocated or migrated between computing instances of the same datacenter or even different datacenters.

Organization migrations may be carried out through close and intensive human supervision from experts experienced in various aspects relating to migrating application data and application services in the data centers. Even if these experts could be available during entire time periods of organization migrations, a large amount of manual input and human supervision may lead to inefficiencies, errors, lack of transparency, degradations, system resource contentions, prolonged downtimes, and even failures.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 3A through FIG. 3C illustrate example concurrency control methods;

DESCRIPTION OF EXAMPLE EMBODIMENTS

Figure 1:
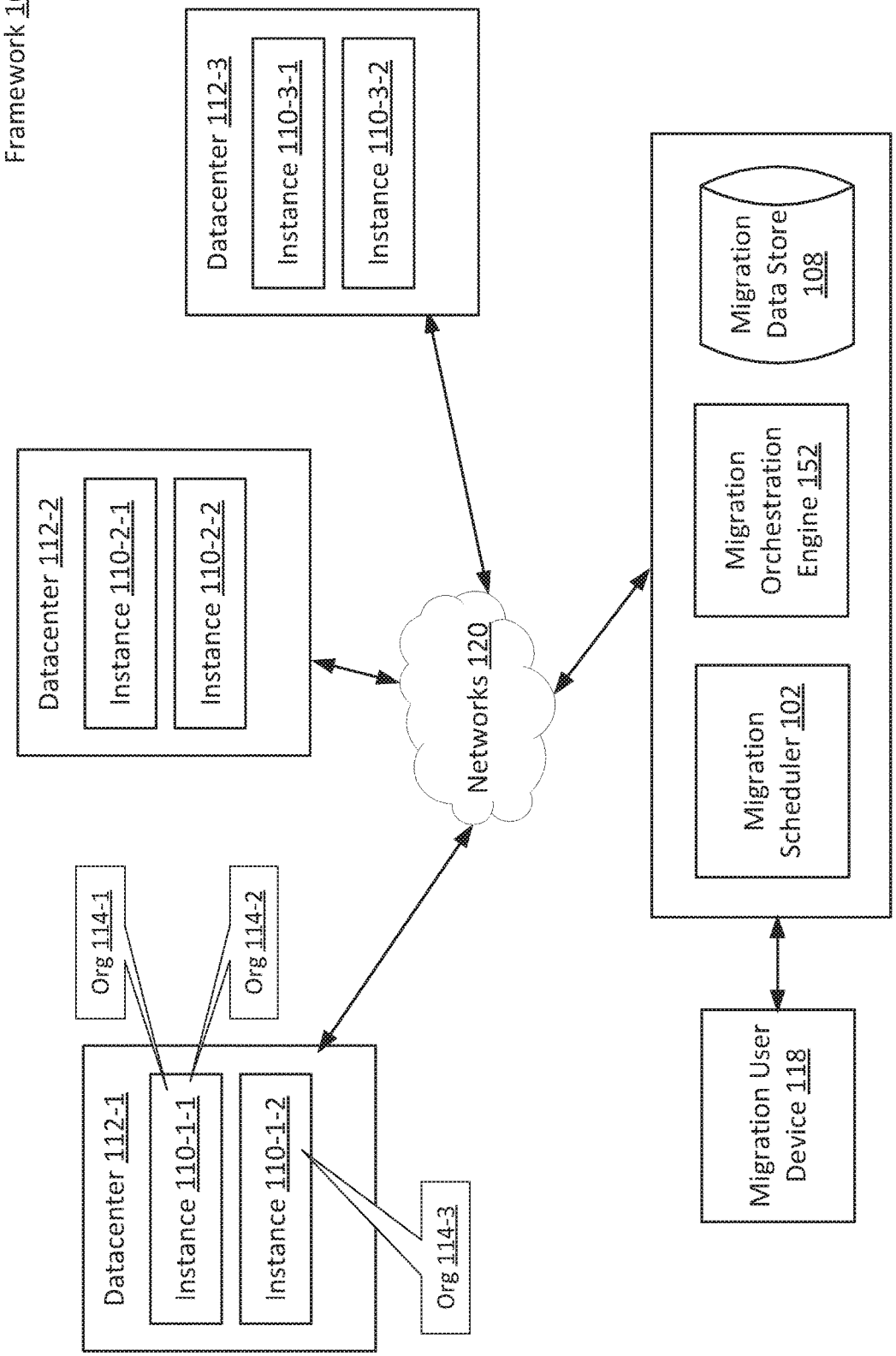
FIG. 1 illustrates an example overall organization migration framework for migrating organizations hosted in a computing system.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
2.0. Functional Overview
   2.1 Migration System Configuration
   2.2 Resource Utilization and Flow Control
   2.3 Concurrency Control and Concurrency Limits
   2.4 Example Concurrency Control Methods
3.0. Example Embodiments
4.0 Implementation Mechanism—Hardware Overview
5.0. Extensions and Alternatives

1.0 GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

An organization migration as described herein moves both application data and application services of an organization (or tenant) from a source system instance of a computing system to a target system instance of the computing system. A migration user, who may be an operator, an administrator, an authorized user, a designated user, etc., for requesting and monitoring organization migration(s), can send or issue a request for the organization migration, for example through a web portal or an organization migration web page, to a migration scheduler. Operational parameters of the organization migration and/or migration configuration data at least a part of which may be carried/embedded within the request and at least a part of which may be collected from the source and target system instances can be validated by the migration scheduler. The migration scheduler can interact with a migration orchestration engine to carry out a plurality of scheduled organization migrations within a selected time window such as a relatively short downtime window, and so forth. Examples of migration schedulers can be found in U.S. patent application Ser. No. 15/882,194, with an application title of "SCHEDULING FRAMEWORK FOR ORGANIZATION MIGRATIONS" by Chen Liu, Sridevi Gopala Krishnan, Ilya Zaslaysky, Alex Ovesea, Mikhail Chainani and Xiaodan Wang, filed on Jan. 29, 2018, the entire contents of which are hereby incorporated by reference as if fully set forth herein. Examples of migration orchestration engines can be found in U.S. patent application Ser. No. 15/882,233, with an application title of "ORCHESTRATION ENGINE" by Alex Ovesea, Ilya Zaslaysky, Chen Liu, Alan Arbizu, Mikhail Chainani, Xiaodan Wang and Sridevi Gopala Krishnan, filed on Jan. 29, 2018, the entire contents of which are hereby incorporated by reference as if fully set forth herein.

Organization migrations as described herein represent a part of normally planned operations in the computing system—which may host a relatively large number of organizations or tenants—to migrate some or all of the hosted organizations efficiently, automatically and accurately with little human intervention in the selected time window.

Application data and application service in a to-be-migrated organization may be temporarily unavailable (but may still provide read-only access in some embodiments) to users and/or customers of the organization in a selected time period (e.g., a maintenance window, etc.). However, all other organizations or tenants hosted in the source system instances and/or the target system instance, which are not migrated in the selected time window, are not affected under techniques as described herein. In other words, users and/or customers of these other organizations can access their respective application data and their respective application services normally, without even being able to notice any concurrent organization migrations are being performed from the source system instance to the target system instance in the selected time window.

At the end of the organization migration (e.g., within the selected time window, etc.), the application data and the application service of the organization are no longer provided from the source system instance, but rather are provided from the target system instance. In other words, before the organization migration, the source system instance hosts the application data and the application services of the organization and provides computing resources to the organization, while the target system instance is not involved in providing computing resources to the organization. After the organization migration, the target system instance hosts the application data and the application services of the organization and provides computing resources to the organization, while the source system instance is no longer involved in providing any computing resources to the organization. Users and/or customers of the migrated organization can access the pre- and post-migration application data and services at user and application levels essentially in the same manner before and after the selected time window.

Computing resource usages of the system instances and progresses of any ongoing organization migrations are monitored under techniques as described herein. Organization migrations are enqueued and carried out efficiently and optimally with flow control, to avoid overloading—which could ultimately delay or negatively impact the migrations through too many retries, too frequent stop-and-go, etc.—the system instances and performance degradation of the system instances. If system, application, network and database resources are available in the system instances, then organization migrations can be continually scheduled and carried out, including but not limited to automatically scheduling, enqueuing and executing any pre-migration steps (or migration steps before the selected time window), migration steps in the selected time window, and/or post-migration steps (or migration steps after the selected time window) in connection with these organization migrations.

Under techniques as described herein, concurrency controller(s) can be implemented to operate with the migration scheduler and the migration orchestration engine to perform flow control (or congestion control) of migration specific actions to be performed for organization migrations.

Instead of inducing overload conditions on the target system instance by sending too many requests for migration specific actions at a single time point, the source system instance, through the concurrency controller(s), can determine traffic lights for resource utilization of the target system instance based on responses from the target system instance. These responses may be responsive to earlier source-system-instance-originated requests for migration specific actions, and may be received by the source system instance from migration application servers running on the target system instance.

The traffic lights for resource utilization of the target system instance can then be used by the source system instance (or migration application servers running thereon) to implement a dynamically adjustable concurrency limit, which effectively constrains threads or messages to request the target system instance to perform. The concurrency limit may be set or revised periodically, with a specific cadence, every one to two minutes, every two to three minutes, every five to ten minutes, etc., based at least in part on the traffic lights.

Thus, under techniques as described herein, a feedback loop is created from the target system instance (or the destination place of deployment or POD) back to the source system instance (or the source POD). The feedback loop allows the source system instance to be informed of resource utilization on the target system instance. As a part of the feedback loop, the source system instance dynamically modifies the amount of migration traffic, which the source system instance sends to the target system instance, based on resource utilization information received through the feedback loop.

For example, application data of a to-be-migrated organization may be partitioned into data chunks. For each data chunk that is sent in a request—which may be a message enqueued into the message queue on the target system instance—from the source system instance to the target system instance, a response (or a return message/value) may be sent from the target system instance to the source system instance. The response may include a view of traffic and/or resource utilization at the target system instance as seen by a migration application server serving the source system instance's request. Traffic lights for resource utilization of the target system instance may be generated by the migration application server running on the target system instance, serialized on the target system instance, and returned in a response body of the response from the target system instance to the source system instance. The traffic lights and/or other information in the response can be used by the source system instances to make flow control decisions depending on specific types/levels (e.g., red, yellow, green, etc.) of the traffic lights.

Traffic lights for resource utilization could be noisy, and could flip back and forth at a relatively fast rate in some operational scenarios in which resource utilization vary over time to a great extent. This situation could be exacerbated further by the source and target system instances each driving traffic through multiple migration application servers with possibly divergent views of resource utilization and possibly conflicting flow controls.

Under techniques as described herein, some or all of responses, traffic lights and underlying resource utilization measurements/statistics are stored in a cache accessible to all migration application servers on a single pod such as each of the source system instance and the target system instance. In some embodiments, a relatively stable state of resource utilization at the target system instance can be ascertained through repeated responses received from the target system instance. The relatively stable state of resource utilization can be flipped (e.g., only, etc.) when a sustained value/level/type is seen (e.g., a clear majority over a percentile threshold, a sequence of the same traffic light for the same resource, five green lights, five consecutive green lights, three red lights, three consecutive red lights, four yellow lights, four consecutive yellow lights, etc.) from the most recently received responses across all migration application servers on the source system instance.

Under some approaches, migration traffic from the source system instance to the target system instance may be disabled or eliminated when high traffic is observed, resulting in a start-stop throughput pattern which inefficiently utilizes resources available.

Flow control as described herein can use concurrency limits/thresholds to constrain the total number of messages/requests for performing migration specific actions or to constrain the total number of concurrent threads sending data (or data chunks) to the target system instance or a specific destination such as a specific database node or data partition in the target system instance. Migration workloads or traffics are expected to be directly or indirectly proportional to, or scaled with, the concurrency limits/thresholds.

When high traffic is observed, the concurrency limits/thresholds are decreased, thereby resulting in less data to be sent and causing workloads/traffics/throughputs to decrease. When normal traffic patterns return, the concurrency limits/thresholds are increased. This allows a reduction of traffic when high traffic is observed and an increase of traffic when low or normal traffic is observed, in sharp contrast to a start-stop or on-off pattern under other approaches that do not implement techniques as described herein.

Resources of the source and target system instances are shared by many processes related or unrelated to organization migrations. In operational scenarios in which processes unrelated to organization migrations underutilize resources, resources can be wasted if the extra capacity available to organization migrations is not detected and utilized.

Flow control techniques as described herein can be implemented to detect the highest amount of traffic that can be pushed to the target system instance or any specific destination therein without hitting traffic lights that signal pending or present saturation/congestion at the target system instance. For example, rather than setting a concurrency limit such as the maximum thread count to a specific hard number, the flow control techniques as described herein can continuously scale the total number of available concurrent threads up and attempt to find the ceiling of throughput available to organization migrations. Once the target system instance is seen as saturated (e.g., at least one resource needed by organization resources is depleted or being pushed above a resource-specific safety threshold as indicated by one or more most recent traffic lights and/or responses, etc.), the concurrency limit such as the maximum concurrent threads can be decreased. However, the total number of concurrent threads can begin scaling up again trying to find a new ceiling if the target system instance is seen as no longer saturated, for example after processes taking up the resources have finished. Thus, the flow control techniques as described herein can be adaptive to realtime or near-realtime traffic and/or resource utilization on one or both of the source and target system instances and try to maximize throughput while maintaining healthy operational states of the source and target system instances.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 FUNCTIONAL OVERVIEW

FIG. 1 illustrates an example overall organization migration framework 100 for migrating organizations hosted in a computing system. Example computing systems that implement the organization migration framework (100) may include, but are not necessarily limited to: any of: a large-scale cloud-based computing system, a system with multiple datacenters, multitenant data service systems, web-based systems, systems that support massive volumes of concurrent and/or sequential transactions and interactions, database systems, and so forth. Various system constituents may be implemented through software, hardware, or a combination of software and hardware. Any, some or all of these system constituents may be interconnected and communicated directly, or through one or more networks 120.

In some embodiments, the computing system that hosts the organizations may comprise a plurality of datacenters such as 112-1, 112-2, 112-3, etc., which may be located at the same or different geographic locations such as the same or different continents, the same or different countries, the same or different states, the same or different regions, and so forth.

Each data center may implement a set of system instances to host respective organizations. These organizations may contract with the owner of the computing system such as a multi-tenant computing system to host their respective (e.g., organization-specific, organization-common, etc.) application data, to provide their (e.g., organization-specific, organization-common, etc.) application services to their respective users and/or customers. Examples of application data may include, but not necessarily limited to only, organization-specific application data, organization-common application data, application configuration data, application data, application metadata, application code, etc., specifically generated or configured for (e.g., organization-specific, organization-common, etc.) application services of an individual organization.

As used herein, the term "organization" may refer to some or all of (e.g., complete, original, a non-backup version of, a non-cached version of, an online version of, original plus one or more backup or cached copies, an online version plus one or more offline versions of, etc.) application data of an organization hosted in the computer system and application services of the organization based at least in part on the application data.

As illustrated in FIG. 1, each datacenter (e.g., 112-1, 112-2, 112-3, etc.) may comprise a set of one or more system instances. A first datacenter 112-1 comprises first system instances 110-1-1, 110-1-2, etc.; a second datacenter 112-2 comprises second system instances 110-2-1, 110-2-2, etc.; a third datacenter 112-3 comprises third system instances 110-3-1, 110-3-2, etc.

Each system instance (e.g., 110-1-1, 110-1-2, 110-2-1, 110-2-2, 110-3-1, 110-3-2, etc.) in the hosting computing system can host up to a maximum number of organizations such as 5,000 organizations, 10,000 organizations, 15,000+ organizations, etc. As illustrated in FIG. 1, the system instance (110-1-1) in the datacenter (112-1) may host a first organization 114-1 and a second organization 114-2, among others; the system instance (110-1-1) in the datacenter (112-1) may host a third organization 114-3, among others.

The migration framework (100) can be used to provide reliable, flexible and scalable organization mobility (e.g., capability to perform mass organization migration, etc.) in the computer system. In some embodiments, organization migrations can be performed fully automatically. In some embodiments, a migration user can choose to specify and perform a (e.g., large, etc.) a part of an organization migration automatically with some manually performed migration steps (or migration specific actions). Statuses of manually performed migration steps (including but not limited to some heavy jobs or long-lasting operations) can be automatically incorporated and taken into account by a schedule engine as described herein while the automatically performed part of the organization migration are being scheduled, enqueued and performed automatically. Thus, the organization migration framework (100) can be used to avoid a manual, lengthy, complicated organization migration process that relies on relatively heavy cross-discipline involvement and cooperation from different personnel and teams over a relatively long time period such as months to plan, enqueue, execute, monitor, activate, rollback, etc.

A migration user such as an operator, an administrator, an authorized user, a designated user, and so forth, can use a migration user device 118 to enter or send a request for an organization migration to a migration scheduler 102 through a migration user interface. The migration user device (118) may be operatively linked to, and communicate with, the migration scheduler (102) through one or more networks (e.g., 120, etc.) or via a local data connection.

Upon receiving the request for the organization migration, the migration scheduler (102) can automatically schedule the requested organization migration to be automatically (e.g., fully automatically, automatically with manual steps specified or performed by a migration user, etc.) executed at least in part through a preparation time window, a downtime window, etc., selected for the organization migration. For the requested organization migration, the migration scheduler (102) may identify a specific organization (e.g., the first organization (114-1), etc.) to be migrated, a source target instance (e.g., the system instance (110-1-1) in the first datacenter (112-1), etc.), a target system instance (e.g., the system instance (110-2-1) in the second datacenter (112-2), etc.), the preparation time window (e.g., a start time, an end time, etc.), the downtime window (e.g., a start time, an end time, etc.), migration configuration data, any commands and/or operational parameters set forth for the requested organization migration, etc. Some or all of the foregoing may be specified in the request for the organization migration. Some or all of the foregoing may be obtained from the source and target system instances for the organization migration. Some or all of the foregoing may be stored as migration configuration data for the requested organization migration in a migration data store 108 in the migration scheduler (102).

At various appropriate time points, the migration scheduler (102) operates with a migration orchestration engine 154 to carrying out the migration specific actions (or migration steps including but not limited to pre-migration steps and/or post-migration steps) for the requested organization migration in the selected preparation time window, the selected downtime window, etc. These migration specific actions automatically (e.g., fully automatically, automatically with manual migration steps specified or performed by a migration user, etc.) move application data and application services of the organization from the source system instance (e.g., 110-1-1, etc.) to the target system instance (e.g., 110-2-1, etc.), thereby causing the organization to automatically migrate from the source system instance (110-1-1) or the first datacenter (e.g., 112-1, etc.) to the target system instance (110-2-1) or the second datacenter (e.g., 112-2, etc.) with no or minimal/minor human intervention (e.g., in normal operational scenarios, etc.).

Additionally, optionally or alternatively, as a part of the organization migration, the migration specific actions automatically (e.g., fully automatically, automatically with a manual part specified or performed by a migration user, etc.) performed under techniques as described herein can cause system configuration data, system data, system metadata, system code, etc., to be (e.g., fully automatically, with minimal manual input, etc.) generated and deployed in connection with the target system instance (110-2-1) and/or the target datacenter or the second datacenter (112-2) in the present example. As used herein, system configuration data, system data, system metadata, system code, etc. refers to system-level data and/or system-level services used to store, access, or manipulate the application data for the organization, to enable the application services, etc.

2.1 Migration System Configuration

Figure 2A:
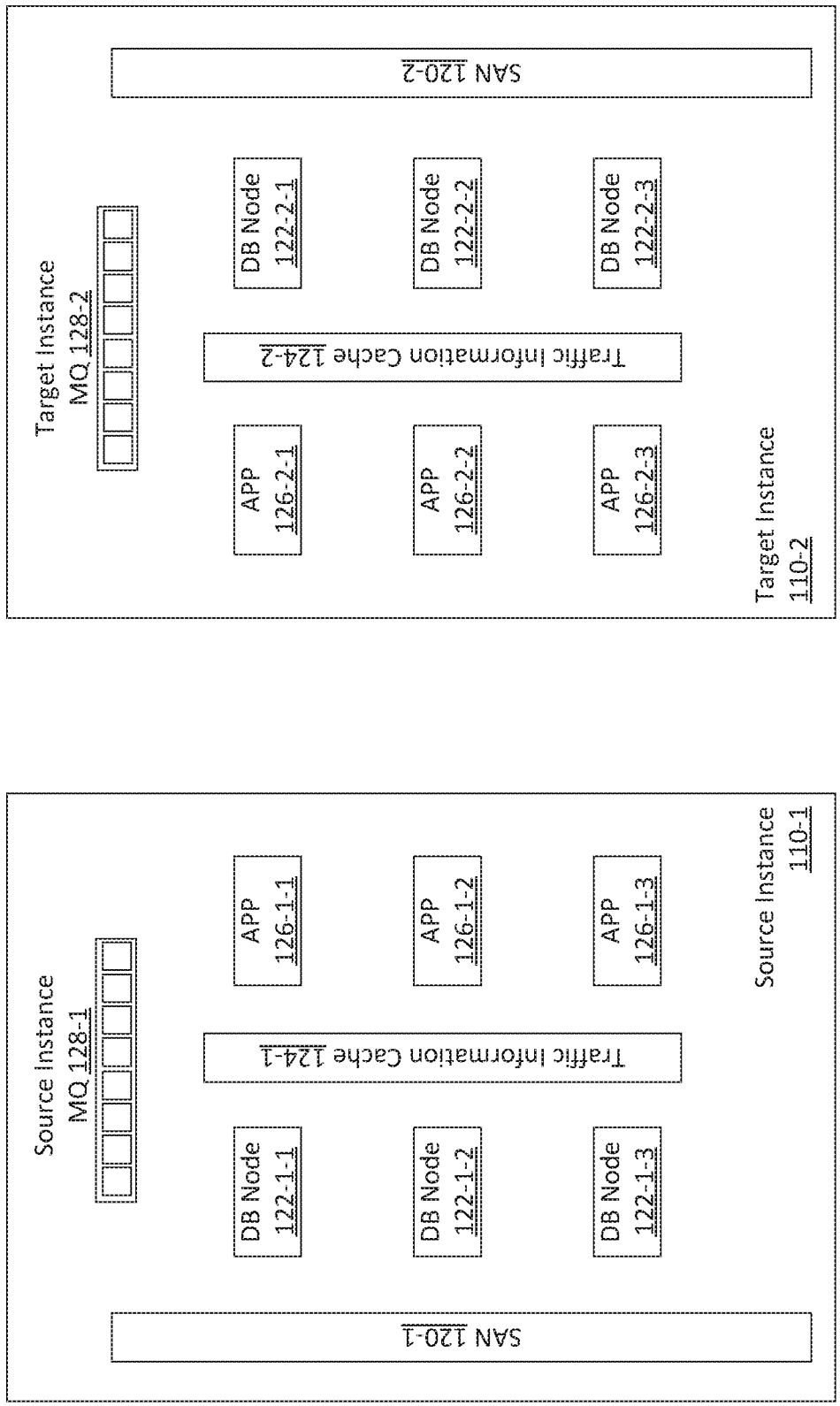
FIG. 2A illustrates an example system configuration of source and target system instances.

FIG. 2A illustrates an example system configuration of a source system instance 110-1 and a target system instance 110-2. A plurality of migration application servers may be deployed on each of the source system instance (110-1) and the target system instance (110-2). As illustrated, a first plurality of migration application servers (denoted as "app") 126-1-1, 126-1-2, 126-1-3, etc., may be running on the source system instance (110-1). Similarly, a second plurality of migration application servers (also denoted as "app") 126-2-1, 126-2-2, 126-2-3, etc., may be running on the target system instance (110-2).

The first plurality of migration application servers (e.g., 126-1-1, 126-1-2, 126-1-3, etc.) running on the source system instance (110-1) can perform database operations such as data queries/reads with respect to data stored in a source database (not shown) on the source system instance (110-1) through first database servers (not shown) on a first set of database nodes (denoted as "DB node") 126-1-1, 126-1-2, 126-1-3, etc. The data may be that of a single to-be-migrated organization or of multiple to-be-migrated organizations. Database servers on different DB nodes of the source system instance (110-1) may access the data in the source database through an instance-level resource, such as a supported maximum I/O throughput (e.g., 100 k IO per second or IOPS, 300 k IOPS, etc.) of a first storage area network (denoted as "SAN") 120-1, that is shared by all DB nodes on the source system instance (110-1).

Likewise, the second plurality of migration application servers (e.g., 126-2-1, 126-2-2, 126-2-3, etc.) running on the target system instance (110-2) can perform database operations such as data writes with respect to data stored in a target database (not shown) on the target system instance (110-2) through second database servers (not shown) on a second set of DB nodes 126-2-1, 126-2-2, 126-2-3, etc. Database servers on different DB nodes of the target system instance (110-2) may access the data in the target database through an instance-level resource, such as a supported maximum I/O throughput (e.g., 100 k IOPS, 300 k IOPS, etc.) of a second storage area network 120-2, that is shared by all DB nodes on the target system instance (110-2).

Migration application servers (e.g., 126-1-1, 126-1-2, 126-1-3, etc.) running on the source system instance (110-1) may be invoked to perform migration specific actions of organization migrations. A migration specific action may be a database storing action on the target system instance (110-2) to move data (e.g., application data, etc.) of one or more organizations from the source database of the source system instance (110-1) into the target database of the target system instance (110-2).

In a non-limiting example, both the source and target databases are Oracle databases. DB nodes (e.g., 122-1-1, 122-1-2, 122-1-3, 122-2-1, 122-2-2, 122-2-3, etc.) may be Oracle Real Application Cluster (RAC) nodes. The organization migrations may cause Oracle data in the source database to be piped or moved into the target database. More specifically, one or more migration application servers (e.g., 126-1-1, 126-1-2, 126-1-3, etc.) running on the source system instance (110-1) may establish database connections with the source database through one or more database servers on the first set of DB nodes (e.g., 122-1-1, 122-1-2, 122-1-3, etc.), and issue database queries, through these database connections, to retrieve the data of to-be-migrated organizations from the source database.

The data of the to-be-migrated organizations may be broken into one or more data chunks. The migration application servers (e.g., 126-1-1, 126-1-2, 126-1-3, etc.) running on the source system instance (110-1) may create one or more messages for performing one or more migration specific actions. Each message in the one or more messages includes a respective data chunk in the one or more data chunks of the to-be-migrated data. By way of enqueuing the one or more messages via message queue (MQ) APIs to a target instance MQ 128-2 of the target system instance (110-2), the to-be-migrated data is streamed or otherwise delivered to the target system instance (110-2).

These messages enqueued into the target instance MQ (128-2) may be dequeued, for example, by servlets (or processing entities) operating in the target system instances (110-2). Some or all information in the messages, including but not limited to the data chunks of the to-be-migrated data, are provided by the servlets (or processing entities) to one or more migration application servers (e.g., 126-2-1, 126-2-2, 126-2-3, etc.) running on the target system instance (110-2).

The one or more migration application servers (e.g., 126-2-1, 126-2-2, 126-2-3, etc.) running on the target system instance (110-2) may establish database connections with the target database through one or more database servers on the second set of DB nodes (e.g., 122-2-1, 122-2-2, 122-2-3, etc.), and issue database writes (e.g., insertions, etc.), through these database connections, to store the data of to-be-migrated organizations to the target database.

Responses—which are responsive to the messages from the source system instance (110-1)—may be sent by the target system instance (110-2) to the source system instance (110-1) or the migration application servers therein. In some embodiments, these responses can be sent via the same servlets (on the target system instance (110-2)) that received or dequeued the messages containing the data chunks from the target instance MQ (128-2).

Additionally, optionally or alternatively, some or all of these responses may be sent by the target system instance (110-2) to the source system instance (110-1) (or the migration application servers therein) via other servlets (or response message handlers) other than the servlets that receive the messages containing the data chunks. For example, some or all of these responses may be provided to the source system instance (110-1) in the form of separate messages enqueued to a source instance MQ 128-1 on the source system instance (110-1). The separate messages dequeued from the source instance MQ (128-1) can be provided to the migration application servers in the source system instance (110-1).

2.2 Resource Utilization and Flow Control

In any given time period, a system instance such as the source system instance (110-1) and the target system instance (110-2) as illustrated in FIG. 2A may perform outbound organization migrations to multiple target system instances and/or inbound organization migrations from multiple source system instance, while providing services to (e.g., a large number of, etc.) other hosted organizations that are not involved in the organization migrations.

In light of limited resources (even though maybe relatively large) shared by many tasks performed at a system instance, under techniques as described herein, flow control (or throttling) may be performed with respect to operations that are to be performed in organization migrations in order to ensure that these organization migrations can be performed in a manner that maximizes efficiency (e.g., less retries, less re-reading of the same data, etc.) and predictability (e.g., predictability in migration times, etc.), while minimizing wasting resources and adverse impacts on other non-migration operations.

Wasted data reads/queries may be prevented at the source system instance (110-1) when the target system instance (110-2) is detected to have little capacity to timely and/or successfully perform data writes, which would be incurred by the data reads/queries at the source system instance (110-1). Data reads/queries at the source system instance (110-1) may be (e.g., only, etc.) flow controlled and performed in response to determining that the target system instance (110-2) can timely and successfully write data from these data reads/queries at the source system instance (110-1) to the target database at the target system instance (110-2). Thus, smooth end-to-end throughput rather than sawtooth throughput in data reads/writes with respect to the source and target databases can be produced.

As used herein, "throughput" may refer to all traffic to be made or completed from a source data store of the source system instance to a target data store of the target system instance over a time period unit (e.g., every 30 seconds, every 1 minute, every 5 minutes, etc.). In some embodiments, throughput as described herein may refer to a total number of DB operations such as DB writes to be made or completed with a target database in the target system instance. The throughput may be constrained or adjusted at the source system instance (110-1) by appropriately setting or adapting a concurrency limit such as the maximum messages to be enqueued to the target instance MQ (128-2), the maximum number of concurrent threads that send data to the target system instance, and so forth.

By operating within a dynamically adaptable concurrency limit, cross-instance messages such as messages from the source system instance (110-1) to the target system instance (110-2) for performing migration specific actions can be dequeued and processed relatively timely, thereby preventing or reducing the likelihood of encountering (brute force) MQ Fair Usage throttling which may negatively and globally impact times of enqueuing and dequeuing operations of all messages including possibly time-sensitive messages.

A number of system, application, network and database resources can be monitored for the purpose of generating traffic lights used in flow control. Example resources may include, but are not necessarily limited to only, one or more of, I/O throughputs (e.g., as provided by SAN, etc.), database writes, redo operations, I/O wait times, App CPU (e.g., CPU resources for running migration application servers, etc.), DB CPU (e.g., CPU resources for running database servers through which data reads/writes can be requested by the migration application servers, etc.), connection pool slack (e.g., how many connections remaining for database connections, etc.), and so forth.

Resources can be measured (e.g., independently, individually, etc.) on one or both of the source system instance (110-1) and the target system instance (110-2). These resources can be measured (e.g., independently, individually, etc.) for application nodes (e.g., for running the migration application servers, for running webservers, for running servlets, etc.), DB nodes (e.g., RAC nodes, etc.), other node-level resources, SANs, other instance-level resources shared by a system instance, etc.

Based on resource utilization, the source system instance (110-1) may control data flow from the source system instance (110-1) to the target system instance (110-2) through source-side throttling of messages to be enqueued to the target instance MQ (128-2).

In an organization migration, data is read on the source system instance (110-1) and sent to the target system instance (110-2), which in turn writes the data as the source system instance (110-1) requested (e.g., in a message to the target instance MQ (128-2), etc.). In some embodiments, the total number of threads on the source system instance (110-1) sending migration data is (e.g., directly, etc.) correlated with the total number of threads on the target system instance (110-2) writing the migration data. In some embodiments, assuming same or similar hardware capabilities and/or resources, the amount of work performed on the target system instance (110-2) for the organization migration may be much more resource intensive than the amount of work performed on the source system instance (110-1). More specifically, data reads on the source system instance (110-1) may not need to involve any data connection through a public network cloud or wide area networks (WANs), whereas data writes on the target system instance (110-2) may need to import the migration data from the source system instance (110-1) by way of the target instance MQ (128-2) through a public network cloud, WANs or a third-party network. In addition, the target system instance (110-2) may need to perform a series of attendant operations related to handling the data writes.

In some embodiments, the source system instance (110-1) can monitor its own resource utilization as well as can receive information of resource utilization of the target system instance (110-2) in the form of traffic lights and/or resource utilization metrics/measurements based on which the traffic lights can be generated or determined.

In some embodiments, the migration application servers (e.g., 126-1-1, 126-1-2, 126-1-3, etc.) on the source system instance (110-1) can receive and share their respective traffic lights and/or resource utilization metrics/measurements (e.g., DB CPU, App CPU, SAN I/O, etc.) of the target system instance (110-2) with one another in a first traffic information cache 124-1 of the source system instance (110-1). Additionally, optionally or alternatively, the migration application servers (e.g., 126-2-1, 126-2-2, 126-2-3, etc.) on the target system instance (110-2) can generate and share their respective traffic lights and/or resource utilization metrics/measurements (e.g., DB CPU, App CPU, SAN I/O, etc.) of the target system instance (110-2) with one another in a second traffic information cache 124-2 of the target system instance (110-2).

Traffic lights and types/levels thereof can be determined or set by applying resource-specific thresholds to specific resource utilization. For example, a traffic light for a resource such as DB CPU may be determined or set as red if a utilization of the resource DB CPU on a DB node exceeds a first resource-specific threshold (e.g., 60%, 65%, 70%, etc.); may be determined or set as green if the utilization of the resource DB CPU does not exceeds a second resource-specific threshold (e.g., 45%, 50%, etc.); and may be determined or set as yellow if the utilization of the resource DB CPU is between the second resource-specific threshold and the first resource-specific threshold.

Similarly, a traffic light for a resource such as database connections can be set based on one or more resource-specific thresholds specifically related to the database connections.

Any, some or all of resource-specific thresholds used to generate traffic lights based on resource measurements/metrics as described herein may be pre-configured, dynamically configurable by system and/or by user input, and so forth. In some embodiments, these thresholds and/or mappings between metrics/thresholds and traffic lights can be specified or defined in a flow control configuration file (or object) such as a JSON file, which may be configured by system and/or user input.

In some embodiments, traffic lights, or transitions of the traffic lights form one type (or level) to another type (or level), are used as triggers for flow control actions. For example, once any resource hits a ceiling or a resource-specific threshold, the source system instance (110-1) can cause a concurrency limit such as the maximum concurrent messages to be enqueued into the target instance MQ (128-2) to change accordingly, thereby limiting migration data traffic from the source system instance (110-1) to the target system instance (110-2).

Figure 2B:
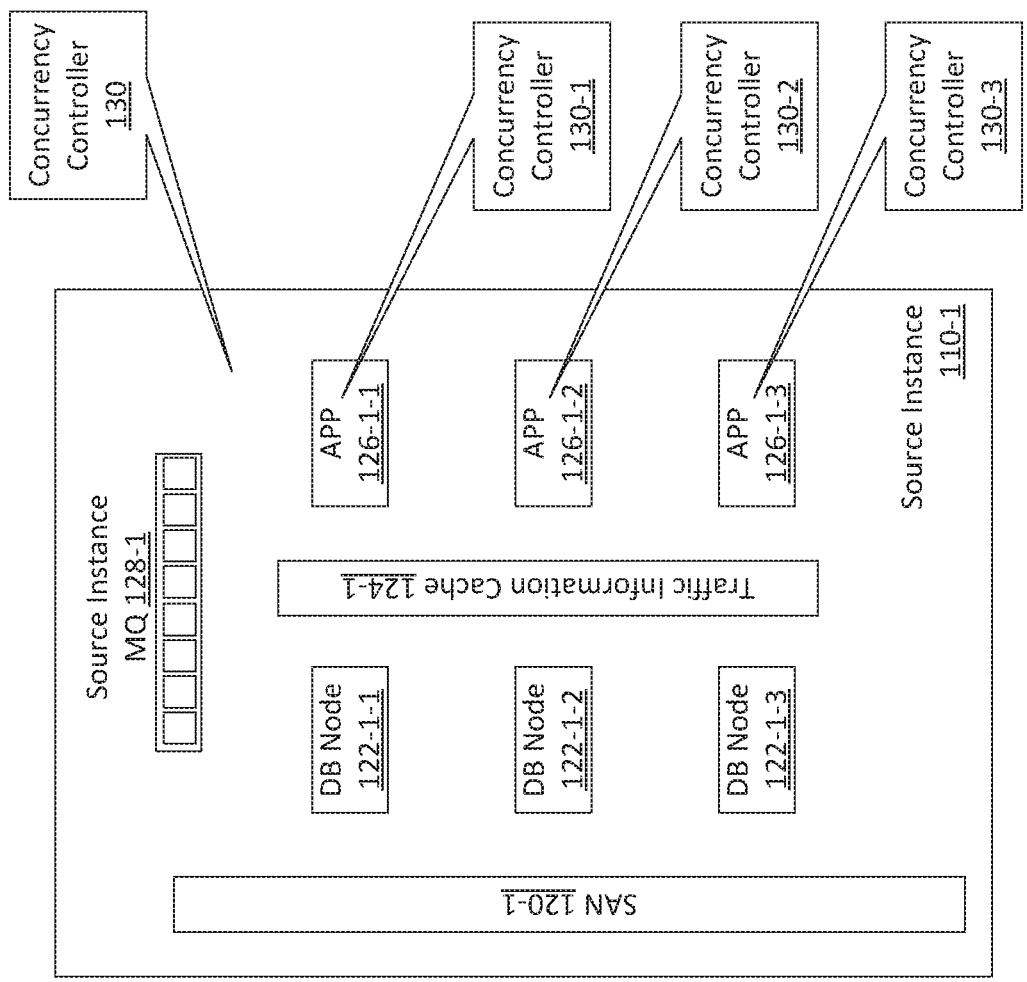
FIG. 2B illustrates example concurrency controllers on a source system instance.

As illustrated in FIG. 2B, the source system instance (110-1) may comprise one or more concurrency controllers (e.g., an instance-level concurrency controller 130, node-level concurrency controllers 130-1 through 130-3, etc.) that executes one or more concurrency control methods to control one or more concurrency limits. Any, some or all of the concurrency controllers (e.g., 130, 130-1 through 130-3, etc.) may be implemented as parts of migration application servers (e.g., 126-1-1, 126-1-2, 126-1-3, etc.) or as separate processing entities (e.g., threads, processes, objects, etc.) operating in conjunction with the migration application servers (e.g., 126-1-1, 126-1-2, 126-1-3, etc.).

In some embodiments, a single concurrency controller (e.g., 130, etc.) may be used to carry out concurrency control operations. In some other embodiments, multiple concurrency controllers (e.g., 130-1 through 130-3, 130 and some or all of 130-1 through 130-3, etc.) are used to carry out concurrency control operations. In these other embodiments, one of the concurrency controllers may be elected or otherwise (e.g., dynamically, statically, etc.) designated as a master concurrency controller to coordinate overall flow control operations among the multiple concurrency controllers.

A concurrency control algorithm as described herein may run periodically, for example every 1-2 minutes, every 5-10 minutes, and so forth. Additionally, optionally or alternatively, a concurrency control algorithm as described herein (e.g., only, etc.) may be triggered to run when traffic lights change from one type or level such as red to another type or level such as yellow, when traffic lights change from one resource to another resource, when traffic lights change from the instance level to a node level or vice versa, and so forth.

In some operational scenarios, multiple nodes may be handling multiple organization migrations as directed by a migration scheduler (e.g., 102 of FIG. 1, etc.) operating in conjunction with a migration orchestration engine (e.g., 152 of FIG. 1, etc.). Each organization involved in the organization migrations may be mapped to a specific data partition of the target database on the target system instance (110-2). Data of each such organization may go through a specific (DB) node on its way to the target database.

In some embodiments, a concurrency control method supports concurrency control at the instance level as well as at a node level. For example, instance-level traffic lights for instance-level resources (e.g., SAN as shared by all DB nodes, etc.), or changes in the instance-level traffic lights cause adjustments to instance-level concurrency limits, whereas node-level (or data-partition-level) traffic lights for node-level (or data-partition-level) resources (e.g., DB CPU, etc.) associated with a specific node (e.g., a DB node, etc.), or changes in the node-level (or data-partition-level) traffic lights cause adjustments to node-level (or data-partition-level) concurrency limits for the specific node. The concurrency control method may switch between different concurrency keys, one of which may be for the instance-level concurrency control generally applied to some or all nodes, and others of which may be for node-level concurrency controls specifically applied to one or more specific nodes.

A concurrency key may be used to limit the scope of the flow control to a particular (e.g., DB, etc.) node or a particular data partition of the target database on the target system instance (110-2). If instance-level and node-level traffic lights are all green, all nodes can proceed with organization migrations. If instance-level traffic lights change to red, then all nodes in the target system instance (110-2) throttle down workloads. If node-level traffic lights change to red but instance-level traffic lights remain green, then specific node(s) related to the node-level traffic lights throttle down workloads.

More specifically, while instance-level resource(s) such as SAN IO may be healthy on the target system instance (110-2), a node-level traffic light (or a node-level sequence of traffic lights) for a node-level resource such as DB CPU on a specific node may change to red. Node-level concurrency control may be performed to lower throughput or limit messages destined to the specific node, while other nodes for other organizations involved in the organization migrations may not be impacted. These other nodes can maintain their existing throughput (or maximum message limits) and can even increase their throughput (or maximum message limits), if their respective node-level traffic lights indicate green or yellow instead of red.

In various possible embodiments, traffic lights can be generated, for example by either concurrency controller(s) or migration application servers on the source system instance (110-1) or by servlets or migration application servers on the target system instance (110-2), based on resource utilization measurements/metrics (e.g., collected from the target system instance (110-2), collected from both the source and target system instances, etc.).

Some or all of traffic lights and/or resource utilization measurements/metrics collected/generated by different migration application servers can be shared in caches. For example, on the target system instance (110-2), traffic lights and/or resource utilization measurements/metrics can be shared in the traffic information cache (124-2) among all the migration application servers (e.g., 126-2-1, 126-2-2, 126-2-3, etc.) on the target system instance (110-2), as the traffic lights and/or the resource utilization measurements/metrics are being generated. On the source system instance (110-1), the traffic lights and/or the resource utilization measurements/metrics can be shared in the traffic information cache (124-1) among all the migration application servers (e.g., 126-1-1, 126-1-2, 126-1-3, etc.) on the source system instance (110-1), as the traffic lights and/or the resource utilization measurements/metrics are being received in responses from the target system instance (110-2).

Thus, what is received or observed by a migration application server on the source system instance (110-1) can be seen by other migration application servers on the source system instance (110-1). Similarly, what is generated or sent by a migration application server on the target system instance (110-2) can be seen by other migration application servers on the target system instance (110-2).

A repeated, majority and/or plurality type or level such as red for traffic lights for a specific resource can be observed by the migration application servers on both the source system instance (110-1) and the target system instance (110-2). The traffic lights with the repeated, majority and/or plurality type or level can be used to filter out noises in the traffic lights. Instead of allowing each individual traffic light to control concurrency/flow on an individual traffic light basis, a sequence of traffic lights or a majority of traffic lights can be used to control concurrency/flow. Concurrency controller(s) on the source system instance (110-1) can make use of aggregated traffic lights from different responses or inputs and make a consistent/uniform decision for concurrency/flow control for the entire instance.

As a result, even though multiple actors (e.g., 30 migration application servers in a system instance, etc.) may be carrying out organization migrations, through relatively stable and non-transient traffic and/or resource utilization states deduced from shared cached traffic information, these multiple actors can take relatively consistent, relatively stable, relatively uniform actions with respect to concurrency/flow/congestion control. In some embodiments, a single master concurrency controller can make an overall decision for concurrency/flow/congestion control based on information written by all other actors such as migration application servers or other non-master concurrency controllers. While the role of the master concurrency controller may be assumable by multiple actors, at any given time, only one of these actors may be designated as the master concurrency controller.

2.3 Concurrency Control and Concurrency Limits

During an organization migration, database tables or data stored therein are moved from a source system instance (e.g., 110-1, etc.) to a target system instance (e.g., 110-2, etc.). The data tables may be broken into multiple data chunks. Each data chunk can be sent over an HTTP-based data connection. In some embodiments, data chunk export (or database read) on the source system instance (110-1) is done by a message queue (MQ) message handler. Data chunk import (or DB write) is done by a servlet (e.g., operating with a migration application server, etc.).

On the source system instance (110-1), the MQ message handler determines traffic lights based on responses received from the target system instance (110-2) and throttles up or down messages that are to be enqueued into the message queue of the target system instance (110-2) depending on system resource utilizations (e.g., on the target system instance (110-2), etc.) as indicated by the traffic lights.

On the target system instance (110-2), the servlet determines the traffic lights based on metrics/measurements of resource utilizations with a set of monitored resources on the target system instance (110-2), and decides whether to process a request for performing one or more migration specific actions or not.

This dual control mechanism for throttling may lead to sawtooth characteristics with respect to data chunk processing. For example, when the traffic lights are green, a lot of work may be performed. The processing of a lot of work in turn causes the resource utilization to increase relatively fast, leading traffic lights to become red. The red traffic lights then cause some or all processing to stop until subsequent traffic lights become yellow. This problem may be exacerbated when a traffic light type such as a red traffic light is sticky. For example, when traffic lights become red, the red traffic lights may remain for five (5) minutes even when the resource utilization that caused the red traffic lights is reduced. In some embodiments, a significant delay such as data guide delays, redo apply delays, etc. may be incurred.

Flow control techniques as described herein may be implemented to allow the source system instance (110-1) as a decision maker to increase or decrease the request rate for performing migration specific actions based on feedbacks from the target system instance (110-2).

This approach can gain a number of advantages. First, a fair utilization of resources (e.g., system resources of the target system instance (110-2), etc.) for data import by the target system instance (110-2) can be achieved during organization migrations. For example, if a sequence of five or more red traffic lights indicating that a utilization of a monitored resource on the target system instance (110-2) exceeds a resource-specific threshold is determined, the source system instance (110-1) can drop the request rate (or maximum concurrency threads) for performing migration specific actions, thereby causing decreases in utilizations of resources such as the utilization of the monitored resource for which the sequence of five or more red traffic lights were determined.

Second, the throughput curve in the overall migration-related data flow from the source system instance (110-1) to the target system instance (110-2) can be effectively smoothened out. Through the source system instance (110-1) itself deciding the request rate for performing migration specific actions based on feedbacks from the target system instance (110-1), continuous predictable progress for organization migrations from the source system instance (110-1) to the target system instance (110-2) can be effectively carried out with relatively high certainty, as compared with other approaches under which both the source system instance (110-1) and the target system instance (110-2) could independently make uncoordinated reactions or adjustments based on their respective possibly conflicting or untimely views of resource utilizations on their own system instances.

In some embodiments, a concurrency limit may be dynamically adjusted by (e.g., a message queue (MQ) concurrency controller on, message handlers on, etc.) the source system instance (110-1) based on the feedbacks from the target system in order to maintain a desired throughput such as a reasonably high throughput supported by the source system instance (110-1) and the target system instance (110-2), even while each of the system instances is performing (e.g., a relatively large amount of, etc.) other operations unrelated to organization migrations.

Example concurrency limits to be adjusted may include, but are not necessarily limited to only, one or more of: maximum concurrency threads per instance on the target system instance (110-2), maximum concurrency threads per DB node of the target system instance (110-2), maximum concurrency threads per data partition of the target database on the target system instance (110-2), a maximum total number of messages that request performing migration specific actions per instance on the target system instance (110-2), a maximum total number of messages that request performing migration specific actions per DB node of the target system instance (110-2), a maximum total number of messages that request performing migration specific actions per data partition of the target database of the target system instance (110-2), and so forth.

As compared with other approaches under which resource management during organization migrations is implemented and performed on both the source and target system for their own resources, resource management under techniques as described herein is simplified as the resource management can be implemented at only one of the source and target system instances, for example, at the source system instance (110-2).

The target system instance (110-2) can provide feedbacks such as traffic lights, resource utilization metrics, etc., to the source system instance in either in-band or out-of-band communications. In in-band communications, a servlet (or a migration application server on the target system instance (110-2)) that imports migration related data or dequeues a message containing such data from the source system instance (110-1) can provide the feedbacks to the source system instance (110-1) through a response to the message enqueued by the source system instance (110-1). In out-of-band communications, another servlet (or another application server) other than the servlet that imports migration related data or dequeues a message containing such data from the source system instance (110-1) can provide the feedbacks to the source system instance (110-1) in a separate message other than the response to the message enqueued by the source system instance (110-1).

In some embodiments, resource utilizations such as feedbacks from the target system instance (110-2) and so forth can be captured on a per organization basis (or on a per organization migration basis). The resource utilizations per organization (or per organization migration) can be used by the source system instance (110-1) to make throttling decisions on a per organization basis (or on a per organization migration basis).

Example flow control on a per organization basis (or on a per organization migration basis) may be implemented as follows. When an organization migration starts, the concurrency limit may be set to a default start value (denoted as "START_CL") such as 5, 10, 15, etc., per DB node (or per data partition of the target database) of the target system instance (110-2).

Every X seconds (e.g., 30 seconds, 60 seconds, 90 seconds, etc.), traffic lights from the target system instance (110-2) are determined or checked in a run of a concurrency control method as described herein. If the traffic lights are green, the concurrency limit may be incremented, for example by adding a positive value (e.g., 2, 3, 4, etc.), by multiplying with a scaling factor of greater than one (1), and so forth. If the traffic lights are yellow, the concurrency limit may be incremented with a lesser amount, for example by adding a positive value (e.g., 1, 2, 3, etc.), by multiplying with a scaling factor of greater than one (1) but less than the scaling factor for green traffic lights, and so forth. If the traffic lights are red, the concurrency limit may be decremented, for example by adding a negative value (e.g., −20, −25, etc.), by multiplying with a scaling factor of less than one (1), and so forth. Additionally, optionally or alternatively, the concurrency limit may be constrained to be no less than a minimum concurrency limit (denoted as "MIN_CL") such as one (1) per DB node or per data partition, and to be no greater than a max concurrency limit (denoted as "MAX_CL" such as sixty (60). The concurrency limit may be adjusted or constrained using an MQ API.

Based on the concurrency limit as set forth with the foregoing adjustments and constraints, the source system instance (110-1) can throttle up or down messages for performing migration specific actions to the message queue of the target system instance (110-2). As a result, more or fewer threads are used by the target system instance (110-2) to carry out migration specific actions as requested by the source system instance (110-1).

The dynamically adjusted concurrency limit can be implemented as a database row that is cached (e.g., in memory, etc.). The database row may be initialized ("INIT") or generated when an organization migration is enqueued. The database row may be updated ("DB UPDATED") every X seconds. A cache for the database row may be updated ("CACHE UPDATED") using a cache TTL of X seconds and a lazy-load cache update approach. The database row may be deleted ("DELETED") when an organization is activated (or when the organization migration ends).

One or more granularities may be supported in concurrency control based on a concurrency key such as (maximum) MQ threads. For traffic lights associated with utilization of an instance-level resource such as SAN I/O throughput (e.g., I/O per second or IOPS, etc.), the source system instance (110-1) can throttle its requests to the target system instance (110-2) at the instance level. For traffic lights associated with non-instance-level resources (e.g., DB CPU per DB node, total traffic per data partition, etc.), the source system instance (110-1) can throttle its requests to the target system instance (110-2) at a non-instance level (e.g., a sub-instance level, a DB node level, a data partition level, etc.), for example to throttle the source-originated requests per combination of a target system instance (e.g., 110-2, etc.) and a data partition, or per combination of a target system instance (e.g., 110-2, etc.) and a DB node if mappings of the requests to DB nodes of the target system instance are known to the source system instance (110-1).

The more specific the concurrency key is, the larger an adjustment step is each time the concurrency limit such as maximum concurrent threads (e.g., thread count, MQ threads, etc.) is modified. For example. if data of to-be-migrated organizations is to be moved into sixteen (16) data partitions of a target database on a target system instance and if the concurrency limit is to be adjusted because of changes in load or resource utilizations (e.g., under a relatively heavy load, etc.), the concurrency limit may (e.g., only, etc.) be scaled by factors of 16. In addition, since at least one (1) thread is needed to forward data from a dequeued message to a given data partition, the minimum concurrency (or the minimum value for the concurrency limit) is sixteen (16) threads (or 1 thread for each data partition). Additionally, optionally or alternatively, a concurrency control method as described herein may implement specific steps to prevent or reduce the likelihood of unfairly throttling a data partition or a DB node (e.g., a RAC node, etc.) which is not under (a relatively heavy) load, while throttling another data partition or another DB node which is under (a relatively heavy) load.

In some embodiments, at least a portion of flow control may be implemented using MQ tiers (e.g., corresponding to different priorities, different levels in an MQ hierarchy, etc.) to ramp up/down requests for performing migration specific actions. For example, messages (for performing migration specific actions) to be enqueued to the message queue of the target system instance (110-1) may start with a MQ type that is limited to MQ Tier 2. Subsequently, messages (for performing migration specific actions) to be enqueued to the message queue of the target system instance (110-1) may scale up (e.g., to MQ Tier 4, etc.) or down as appropriate based on received/determined traffic lights. This way, the throttling of messages for performing migration specific actions are accomplished by reducing or preventing MQ CPU time to be allocated for lower MQ tier messages, without putting stress on the system instances through unnecessary message enqueues/dequeues (e.g., during failure cases, in abnormal conditions, etc.). Additionally, optionally or alternatively, a concurrency control method as described herein may implement specific steps to prevent or reduce the likelihood of throttling all lower tier MQ messages if messages are downgraded to lower tiers because a single target system instance or a single DB node (or a single data partition) is under (a relatively heavy) load.

Additionally, optionally or alternatively, a MQ message type may be set for each MQ tier, and messages may be requeued once traffic lights are returned from a target system instance (e.g., under a relatively heavy load, etc.) into a different message type (or into a different MQ tier). Additionally, optionally or alternatively, in some operational scenarios, occasional traffic bursts are acceptable. Thus, flow control may be focused more on preventing or reducing the likelihood of high sustained traffic. It may be safe to process a request/message for performing one or more migration specific actions and return traffic lights (e.g., levels, status, measurements, metrics, etc.) at the end of processing the request/message (or after the migration specific actions are performed). A success status code (e.g., 200, etc.) may be returned in a response and the message body of the response may be used to communicate throttling adjustments (or underlying traffic lights or metrics), as opposed to returning a non-success status code (e.g., 429, etc.) in a generic acknowledgment (or a gack). In some embodiments, a sliding window algorithm may be used to store responses to messages dequeued from the message queue (MQ), a count of continuous traffic light responses (a sustained traffic light type such as a a sequence of red traffic lights), a (e.g., direct, etc.) comparison with the current last returned value (in the most recently sent response), etc. In some embodiments, a sliding window may not be used, since a throttling algorithm can have the same (or even faster) time resolution than determining/receiving traffic lights (e.g., one (1) minute, etc.). Keeping a count of continuous traffic light responses (or a sustained traffic light type) may be useful to avoid noise in traffic lights such as a first traffic light type (e.g., green, etc.) among a sequence of traffic lights of another traffic light type (e.g., red, etc.).

A traffic light as described herein may be characterized into a plurality of categories. A traffic light may be associated with a node-level resource, and indicates whether a utilization of the node-level resource exceeds a first node-level resource-specific threshold (e.g., for red traffic light, etc.), or exceeds a second node-level resource-specific threshold (e.g., for yellow traffic lights, lower than the first node-level resource-specific threshold, etc.) but is below the first node-level resource-specific threshold, or below the second node-level resource-specific threshold (e.g., for green traffic lights, etc.). Example node-level resources may include, but are not necessarily limited to only, any of: DB CPU, etc.

A traffic light may be associated with an instance-level resource, and indicates whether a utilization of the instance-level resource exceeds a first instance-level resource-specific threshold (e.g., for red traffic light, etc.), or exceeds a second instance-level resource-specific threshold (e.g., for yellow traffic lights, lower than the first instance-level resource-specific threshold, etc.) but is below the first instance-level resource-specific threshold, or below the second instance-level resource-specific threshold (e.g., for green traffic lights, etc.). Example instance-level resources may include, but are not necessarily limited to only, any of: database Redo resources, SAN I/O resources, etc.

Additionally, optionally or alternatively, fewer or more traffic light types other than red, yellow and green and/or fewer or more resource-specific thresholds may be used to generate traffic lights to be used by the source system instance (110-1) to perform flow control.

2.4 Example Concurrency Control Methods

A concurrency controller as described herein can implement any in a variety of concurrency control methods. FIG. 3A illustrates an example concurrency control method. This method may disregard the distinction between instance level and node level traffic lights. In some embodiments, this concurrency control method can be applied to control instance-level concurrency alone. A unique identifier for the target system instance (110-2), such as the database identifier for the target database of the target system instance (110-2), can be used as a concurrency key in the concurrency control method implemented/performed by the concurrency controller on the source system instance (110-1) in relation to the target system instance (110-2). In operational scenarios in which the concurrency controller on the source system instance (110-1) implements/performs multiple concurrency controls for multiple target system instances, respective unique identifiers for the multiple target system instances can be used as respective concurrency keys to distinguish concurrency controls among the multiple target system instances.

A single concurrency controller may perform this method to control a single scaling thread count for the entire target system instance. The maximum concurrent threads on the target system instance (110-2) can be scaled down if any most recently received/determined traffic light (or any most recently received/determined sequence of traffic lights) indicates that a utilization of a monitored system resource exceeds a resource-specific threshold set forth for the monitored system resource, regardless of whether the traffic light (or the sequence of traffic lights) or the monitored system resource is at the instance level or at the node level. In some embodiments, the maximum concurrent threads on the target system instance (110-2) corresponds to (e.g., equal, is proportional to, etc.) the maximum number of messages for migration specific actions that have been dequeued at the target system instance with ongoing processing.

This method is relatively simple and provides the concurrency controller with a relatively smooth flow control scaling behavior. In operational scenarios in which instance-level traffic lights or utilizations of instance-level resources are constraining factors (e.g., in mass organization migrations, etc.), this concurrency control method is expected to provide a relatively optimal scaling behavior. On the other hand, in operational scenarios in which node-level traffic lights are triggered on a single DB node of the target system instance (110-2), amounts of traffic to all other DB nodes of target system instance (110-2) leading to (unnecessarily) reduced overall throughput. This concurrency control method may be most suitable if only a single migration is being performed on (e.g., a single DB node of, etc.) the target system instance (110-2), or if only instance-level traffic lights are reporting elevated usages (of instance-level system resources on the target system instance (110-2)).

As illustrated in FIG. 3A, concurrency control as described herein may operate with a back-off factor "BACK_OFF_FACTOR" (or BOF), which may be less than one (1), a slow scale factor "SLOW_SCALE_FACTOR" (or SSF), which may be greater than one (1) and a rapid scale factor "RAPID_SCALE_FACTOR" (or RSF), which may be greater than the slow scale factor RSF. In response to determining that a traffic light (or a sequence of traffic lights) for a resource is RED, the maximum concurrency threads (or "concurrencyControllerThreads") is adjusted by multiplying with the back-off factor BOF. In response to determining that the traffic light (or the sequence of traffic lights) for the resource is YELLOW, the maximum concurrency threads is adjusted by multiplying with the slow scale factor SSF. In response to determining that the traffic light (or the sequence of traffic lights) for the resource is GREEN, the maximum concurrency threads is adjusted by multiplying with the fast scale factor RSF.

FIG. 3B illustrates an example concurrency control method at both the instance level and the node level, which may be implemented/performed with multiple controllers.

When one or more (node-level) traffic lights (e.g., a sequence of node-level traffic lights) indicates (e.g., as red, etc.) that a utilization of a monitored (node-level) system resource at a DB node (e.g., a RAC node, etc.) exceeds a resource-specific threshold set forth for the monitored system resource, traffic to that DB node is slowed down. On the other hand, when one or more (instance-level) traffic lights (e.g., a sequence of instance-level traffic lights) indicates (e.g., as red, etc.) that a utilization of a monitored (node-level) system resource (e.g. I/Os to the SAN ( ) of the target system instance (110-2), etc.) at the target system instance (110-2) exceeds a resource-specific threshold set forth for the monitored system resource, all traffics to (all DB nodes of) the target system instance (110-2) are slowed down. when Instance-Level traffic lights are Red, we need to slow all (buffalo) traffic to that instance. In some embodiments, two sets of concurrency controllers, one for the instance level and the other for the node level, may be used to implement concurrency control under this method of FIG. 3B.

For node-level concurrency controls, a combination of a first unique identifier for the target system instance (110-2), such as the database identifier for the target database of the target system instance (110-2), and a second unique identifier (e.g., racNodeId, etc.) for a DB node (e.g., 122-2-1, 122-2-2, 122-2-3, etc.) can be used as a concurrency key in the concurrency control method implemented/performed by one or more (e.g., node-level, etc.) concurrency controllers on the source system instance (110-1) in relation to the DB node of the target system instance (110-2). In operational scenarios in which a concurrency controller on the source system instance (110-1) implements/performs multiple concurrency controls for multiple DB nodes of one or more target system instances, combinations of respective unique identifiers for the multiple target system instances and respective unique identifiers for the multiple DB nodes thereof can be used as respective concurrency keys to distinguish concurrency controls among the multiple DB nodes of the multiple target system instances.

Additionally, optionally or alternatively, for node-level concurrency controls, a combination of a first unique identifier for the target system instance (110-2), such as the database identifier for the target database of the target system instance (110-2), and a second unique identifier (e.g., dataPartitionId, etc.) for a data partition (not shown) of the target database of the target system instance (110-2) can be used as a concurrency key in the concurrency control method implemented/performed by one or more (e.g., node-level, etc.) concurrency controllers on the source system instance (110-1) in relation to the data partitions of the target system instance (110-2). In operational scenarios in which a concurrency controller on the source system instance (110-

1) implements/performs multiple concurrency controls for multiple data partitions of one or more target system instances, combinations of respective unique identifiers for the multiple target system instances and respective unique identifiers for the multiple data partitions thereof can be used as respective concurrency keys to distinguish concurrency controls among the multiple data partitions of the multiple target system instances.

In some embodiments, a unique identifier for a DB node may not be known (at least initially at the start of organization migrations in which concurrency controls are to be performed) to the source system instance (110-1) or concurrency controller(s) thereon. However, the data partitions of the target database may be known to the source system instance (110-1) or the concurrency controller(s) thereon. The DB nodes of the target system instance (110-2) may have a definite mapping relationship (e.g., 1-1, many-to-one, one-to-many, many-to-many, as set forth in the system configuration of the target system instance (110-2), etc.) with the data partitions of the target database of the target system instance (110-2). Thus, the data partitions based on which node-level concurrency controls may be performed can serve as a highly correlated proxy to, or a relatively close approximation of, the DB nodes, even though the mapping relationship between the DB nodes and the data partitions of the target database of the target system instance may evolve or change (e.g., dynamically but infrequently, etc.).

For the instance-level concurrency control, a unique identifier for the target system instance (110-2), such as the database identifier for the target database of the target system instance (110-2), can be used as a concurrency key in the concurrency control method implemented/performed by a (e.g., instance-level, etc.) concurrency controller on the source system instance (110-1) in relation to the target system instance (110-2). In operational scenarios in which a concurrency controller on the source system instance (110-1) implements/performs multiple concurrency controls for multiple target system instances and/or multiple DB nodes of one or more target system instances, respective unique identifiers for the multiple target system instances can be used as respective concurrency keys to distinguish concurrency controls among the multiple target system instances and from the multiple DB nodes of the one or more target system instances.

In some embodiments, instance-level traffic light(s) may take priority over node-level traffic light(s). The concurrency control method as illustrated in FIG. 3B distinguishes between a node-level traffic light and an instance level traffic light. Under this method, data (e.g., application data of to-be-migrated organization(s), etc.) can be optimally moved when node-level traffic lights are firing. Additionally, optionally or alternatively, under this method, concurrency control can be switched as instance-level traffic light(s) and node-level traffic light(s) are being received. The method can be implemented to compute an optimal number of concurrency threads between an aggressive number of concurrency threads with a risk of bursting traffic past a high watermark of traffic and a conservative number of concurrency threads with a risk of swapping between red and green traffic lights and a zig-zag throughput at a relatively fast pace (e.g., every minute, every ½ minute, every run of the concurrency control method, etc.). The concurrency control method may be implemented by multiple concurrency controllers executing in series, in parallel, in part parallel in part series, etc.

In some operational scenarios, while a switching of concurrency control is being made from a node level to the instance level, from the instance level to a node level, from a node level with a first DB node to a node level with a second DB node, a first concurrency controller may dequeue, or may permit dequeuing, messages that contain data portions to the target database of the target system instance (110-2) or to a first data partition in the target database of the target system instance (110-2) in response to determining that such dequeuing is permitted based on a before-switching run of the concurrency control method of FIG. 3B. In the meantime, a second concurrency controller may dequeue, or may permit dequeuing, messages that contain data portions to a second data partition in the target database of the target system instance (110-2) or to the target database of the target system instance (110-2) in response to determining that such dequeuing is permitted based on a post-switching run of the concurrency control method of FIG. 3B.

Thus, it is possible that further spikes in throughput of traffic from the source system instance to the target system instance could be observed when alternating node/instance level traffic lights would cause a switching of concurrency control from a node level to the instance level, from the instance level to a node level, from a node level with a first DB node to a node level with a second DB node.

As illustrated in FIG. 3B, in response to determining that an instance-level traffic light (or a sequence of instance-level traffic lights) for an instance-level resource is RED (indicating that a utilization of the instance-level resource exceeds a resource-specific threshold), a number of steps may be performed, for example with an instance-level concurrency controller. First, the database identifier "destInstanceDbId" is used as a concurrency key. Second, it is determined whether the last throttle (e.g., the last run of the concurrency control method of FIG. 3B, etc.) was based on a previous instance-level traffic light (or a previous sequence of instance-level traffic lights). In response to determining that the last throttle (e.g., the last run of the concurrency control method of FIG. 3B, etc.) was based on a previous instance-level (e.g., red, green, yellow, etc.) traffic light (or a previous sequence of instance-level traffic lights), the maximum instance-level concurrency threads is adjusted by multiplying with the scaling factor BOF. In response to determining that the last throttle (e.g., the last run of the concurrency control method of FIG. 3B, etc.) was based on a previous node-level traffic light (or a previous sequence of node-level traffic lights), the maximum instance-level concurrency threads is adjusted to a value equal to an aggregated number (e.g., an aggregate function such as sum ( . . . ), etc.) of all node-level concurrency threads multiplied with the scaling factor BOF.

In response to determining that a node-level traffic light (or a sequence of node-level traffic lights) for a node-level resource is RED (indicating that a utilization of the node-level resource exceeds a resource-specific threshold), a number of steps may be performed, for example with a node-level concurrency controller (possibly among a plurality of node-level concurrency controllers). First, a combination of the database identifier "destInstanceDbId" and a data partition identifier "partitionDbId" (or a DB node identifier "racNodeId" if available in some embodiments), where the data partition identifier "partitionDbId" is associated with a data partition to which the node-level resource is associated (e.g., the node-level resource such as DBCPU is used to access data in the data partition, etc.), is used as a concurrency key. Second, it is determined whether the last throttle (e.g., the last run of the concurrency control method of FIG. 3B, etc.) was based on a previous node-level traffic light (or a previous sequence of instance-level traffic lights). In response to determining that the last throttle (e.g., the last run of the concurrency control method of FIG. 3B, etc.) was based on a previous node-level (e.g., red, green, yellow, etc.) traffic light (or a previous sequence of instance-level traffic lights), the maximum node-level concurrency threads for the data partition is adjusted by multiplying with the scaling factor BOF. In response to determining that the last throttle (e.g., the last run of the concurrency control method of FIG. 3B, etc.) was based on a previous instance-level traffic light (or a previous sequence of node-level traffic lights), the maximum node-level concurrency threads for the data partition is adjusted to a value equal to a partitioned number, such as a previous maximum instance-level concurrency threads divided by the total number of data partitions such as 32, multiplied with the scaling factor BOF.

The foregoing steps as illustrated in FIG. 3B may be repeat for other types such as yellow and green traffic lights (or sequences of yellow or green lights) using SSF or RSF as scaling factors, respectively.

FIG. 3C illustrates an example concurrency control method at both the instance level and the node level, which may be implemented/performed with a single controller.

This concurrency control method can be used to address some challenges of the concurrency control method of FIG. 3B by using the single controller to scale concurrency threads based on which traffic light (or which sequence of traffic lights) is firing. The method can use node-level concurrency keys (e.g., combinations of DestInstanceDbIds and PartitionDbIds, etc.) to set maximum concurrency thresholds at node levels. In response to determining that an instance-level traffic light (or a sequence of instance-level traffic lights) is firing, maximum concurrency thresholds for all data partitions (or DB nodes in some embodiments) can be scaled by the same value using the node-level concurrency keys.

In the concurrency control method of FIG. 3C, node-level throttles or concurrency controls for specific data partitions of the target system instance (110-2) can still be performed when node-level traffic lights (or sequences of node-level traffic lights) are firing. Some of the issues related to alternative instance-level and node-level traffic lights (or alternative sequences of instance-level traffic lights and of node-level traffic lights) can be avoided by this concurrency control method by only maintaining one kind of concurrency keys.

However, this method may have some issues relating to step sizes. In the case of an instance-level traffic light (or a sequence of instance-level traffic lights) being fired, the minimum step size for scaling concurrency threads is one (1) thread per data partition amounting to 32 threads if the total number of data partitions of the target database is 32. In addition, the minimum number of concurrency threads would be one (1) thread per data partition amounting to 32 threads if the total number of data partitions of the target database is 32. Both of the step size and the minimum number of concurrency threads may be relatively large (or a relatively large quantization step), leading to issues relating to maintain smooth flow control and a relatively high probability of sawtooth throughput, even though flow control as described herein may be less spiky than otherwise (e.g., no flow control as described herein, etc.). In some embodiments, a different concurrency control method can be implemented to avoid or ameliorate these issues or challenges. In some operational scenarios, the concurrency control method of FIG. 3C may be used to provide relatively uniform instance-level traffic-light-based throttling across data partitions (or DB nodes) of the target database on the target system instance (110-2). Additionally, optionally or alternatively, further steps may be implemented in this method to deal with throttling instance-level traffic and/or node-level traffic when only a few data partitions are providing the bulk of the traffic, when any of the under-utilized data partitions are spiking in throughput, and so forth.

As illustrated in FIG. 3C, in response to determining that a traffic light (or a sequence of traffic lights) is RED (indicating that a utilization of a instance-level or node-level resource exceeds a resource-specific threshold), a number of steps may be performed. It is determined whether the traffic light (or the sequence of traffic lights) is at a node level.

In response to determining that the traffic light (or the sequence of traffic lights) is associated with a data partition (or a DB node) at a node level, a node-level threshold such as maximum concurrency threads is adjusted by multiplying with the scaling factor BOF. Additionally, optionally or alternatively, after the data partition (or the DB node) is throttled/adjusted (or not), an instance-level threshold such as maximum concurrency threads at the instance level may be computed, for example may be dropped by the equal amount to what has been scaled for the data partition in the node-level threshold.

In response to determining that the traffic light (or the sequence of traffic lights) is associated with the target system instance (110-2) at the instance level, the maximum concurrency threads (denoted as "maxThreads") at the instance level may be adjusted by multiplying with the scaling factor BOF. A total number of threads (denoted as "threadsToFree") to be freed (e.g., not designated to be used for data access, etc.) across all data partitions (or all DB nodes) of the target system instance (110-2) may be computed as a difference between the maximum concurrency threads and a summation of all maximum concurrency threads (denoted as "concurrencyControllerThreads") at node levels. A total number of threads (denoted as "threadsToFreePerPartition") to be freed per data partition (or per DB node) may be computed as the total number of threads ("threadsToFree") to be freed across all data partitions divided by the total number of data partitions (denoted as "partitions"). Each node-level threshold such as maximum concurrency threads for each data partition (or each DB node) may be adjusted by subtracting with the total number of threads ("threadsToFreePerPartition") to be freed per data partition (or per DB node).

The foregoing steps as illustrated in FIG. 3C may be repeat for other types such as yellow and green traffic lights (or sequences of yellow or green lights) using SSF or RSF as scaling factors, respectively.

A concurrency control method as described herein may take into account how the concurrency flow control model behaves at the extremes. By way of example but not limitation, a maximum concurrency is (e.g., only, etc.) bounded by a message queue (MQ) (e.g., on the target system instance (110-2) into which messages representing requests for performing migration specific actions as sent/issued by migration application servers on the source system instance (110-1), for example bounded by the total number of messages that have been dequeued from the MQ but with ongoing processing (e.g., not yet return responses to the source system instance (110-1), etc.). In these embodiments, the concurrency control method implementing the concurrency control model may cap the total number of messages enqueued to the MQ but with ongoing processing to stop at a specific maximum MQ concurrency (or a specific MQ message limit) so that, once throttling is to be applied, the present relatively high thread count is still within a reasonable range (not to blown off or reach some hard limits in the target system instance, in which cases non-smooth backing off and overloading may occur).

There are a few ways to tackle issues related to the minimum concurrency with which concurrency thread has reached down to one (1) thread (or one (1) message) per data partition or per node, etc. In cases in which backing off is still needed at the minimum concurrency, a simple way may be to begin increasing the (e.g., re-enqueue, per-message enqueuing, etc.) delay. Another option may be to demote the message type of messages requesting migration specific actions to another MQ tier (or another MQ priority) that is low enough to help the target system instance (110-2) to recover or alleviate from a presently already loaded condition.

A concurrency control method as described herein may drive the concurrency decisions from the source system instance (110-1) based on feedback received from the target system instance (110-2).

In an example, the target system instance (110-2), or migration application servers therein, can return a response with a specific status code (e.g., 429, a user-defined response code, a user-extended response code, etc.) for the message type with which requests (or messages) for performing migration specific actions are sent by the source system instance (110-1).

In another example, the target system instance (110-2), or migration application servers therein, can return a response with a generic status code (e.g., 200, a system-designated response code, a protocol-designated response code, etc.) for the message type with which requests (or messages) for performing migration specific actions are sent by the source system instance (110-1). Appropriate traffic light information (e.g., levels of traffic lights such as red, yellow or green, metrics or measurements underlying traffic lights, etc.) in response bodies of responses/results sent in response to the requests (or the messages) for performing the migration specific actions.

Some or all of the responses/results sent from the target system instance (110-2) to the source system instance (110-1) may be cached on one or both of the source system instance (110-1) or the target system instance (110-2). A concurrency controller (e.g., implementing some or all of a concurrency control method, etc.) as described herein can use the cached responses/results to determine how many concurrent threads are allowed. In some embodiments, a two-tier cache using memcache and an in-memory cache may be used to store the last few received responses/results (or responses/results received in the last time period) including but not limited to levels of traffic light on the source system instance (110-1). The memcache values (or cached responses/results) can be stored in-memory for faster retrieval at runtime (e.g., at dequeue time or while messages are being dequeued by the target system instance (110-2), etc.). In some embodiments, the memcache and the in-memory cache may have respective times-to-live (TTLs). By way of example but not limitation, both the memcache and the in-memory cache can have a one (1) minute TTL, for example corresponding to the same amount of time allocated for each run of the concurrency control method to update traffic lights by the target system instance (110-2).

3.0 EXAMPLE EMBODIMENTS

Figure 4:
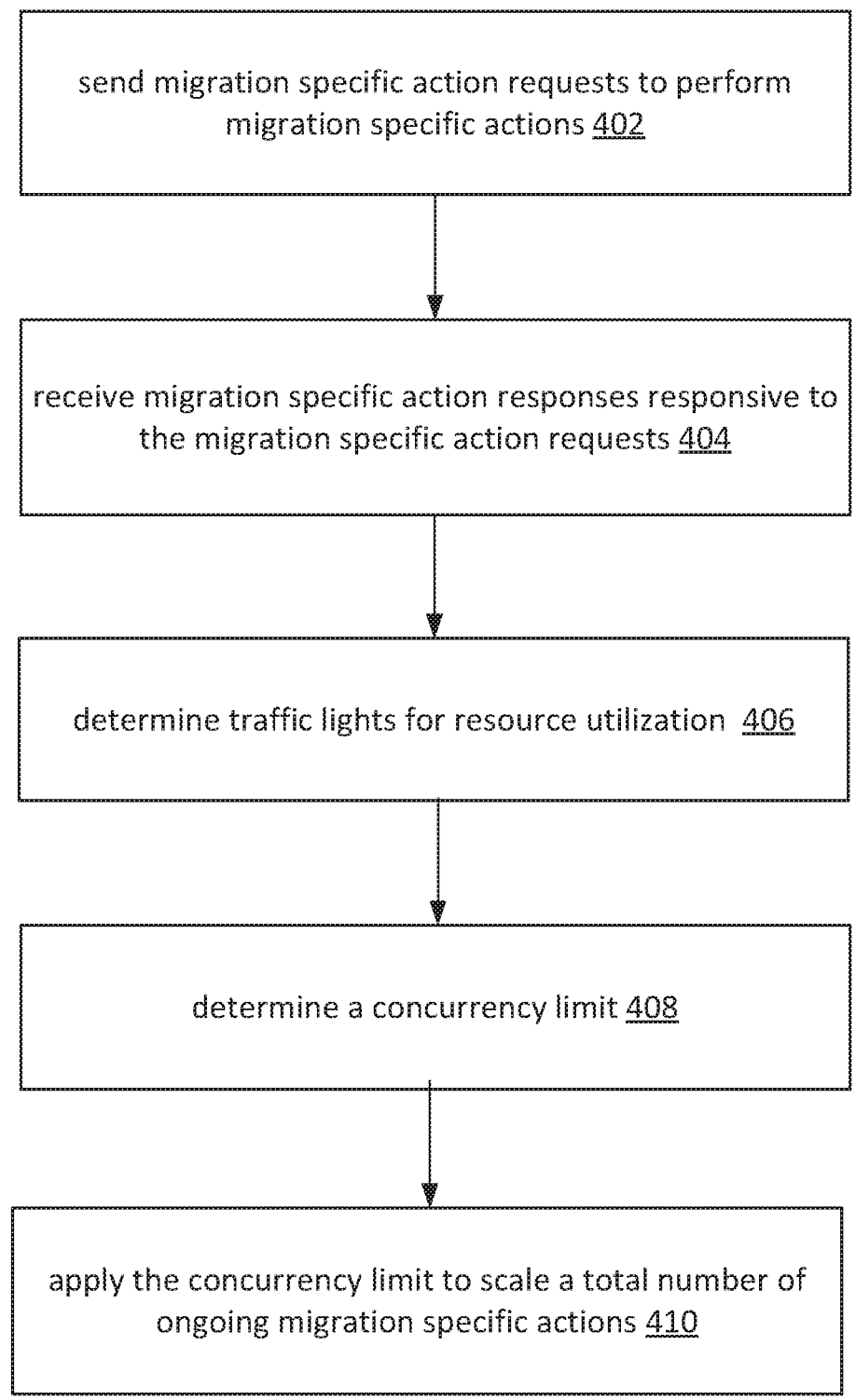
FIG. 4 illustrates an example process flow.

FIG. 4 illustrates an example process flow that may be implemented by a computing system (or device) as described herein. In block 402, a source system instance (e.g., 110-1 of FIG. 2A or FIG. 2B, etc.) sends, from a source system instance of a computing system to a target system instance of the computing system, a set of migration specific action requests to perform a set of migration specific actions.

In block 404, the source system instance receives, from the target system instance before a specific time, a set of migration specific action responses that are responsive to the set of migration specific action requests to perform the set of migration specific actions.

In block 406, based on the set of migration specific action responses, the source system instance determines a sequence of traffic lights for resource utilization of the target system instance.

In block 408, based at least in part on the sequence of traffic lights, the source system instance determines a concurrency limit for the specific time.

In block 410, the source system instance applies the concurrency limit to scale a total number of ongoing migration specific actions to be requested of the target system instance at the specific time.

In an embodiment, a previous concurrency limit that was applied before the specific time is reduced by a first number to generate the concurrency limit for the specific time in response to determining that the sequence of traffic lights represents a sequence of red traffic lights; the previous concurrency limit is increased by a second number to generate the concurrency limit for the specific time in response to determining that the sequence of traffic lights represents a sequence of yellow traffic lights; the previous concurrency limit is increased by a third number greater than the second number to generate the concurrency limit for the specific time in response to determining that the sequence of traffic lights represents a sequence of green traffic lights.

In an embodiment, the set of migration specific action requests are sent to the target system instance by a plurality of migration application servers running on the source system instance; the sequence of traffic lights is collected from the target system instance by the plurality of migration application servers running on the source system instance; the sequence of traffic lights as collected by the plurality of migration application servers running on the source system instance are shared among the plurality of migration application servers running on the source system instance.

In an embodiment, the set of migration specific action requests to perform the set of migration specific actions are sent to a plurality of migration application servers running on the target system instance for execution; the sequence of traffic lights is sent by the plurality of migration application servers running on the target system instance to the plurality of migration application servers running on the source system instance; the sequence of traffic lights as sent by the plurality of migration application servers running on the target system instance are shared among the plurality of migration application servers running on the target system instance.

In an embodiment, the sequence of traffic lights represents one of: a plurality of consecutively received traffic lights by the source system instance from the target system instance, a majority of received traffic lights by the source system instance from the target system instance, etc.

In an embodiment, the target system instance comprises a plurality of database nodes; the sequence of traffic lights relates to consuming node-level resources at a specific database node in the plurality of database nodes on the target system instance; the source system instance is further configured to: based at least in part on the sequence of traffic lights, apply a node-level control algorithm to determine the concurrency limit as a node-level concurrency limit for the specific database node.

In an embodiment, the target system instance comprises a plurality of database nodes; wherein the sequence of traffic lights relates to consuming instance-level resources on the target system instance; the source system instance is further configured to: based at least in part on the sequence of traffic lights, apply a instance-level control algorithm to determine the concurrency limit as an overall instance-level concurrency limit for the target system instance.

In an embodiment, the total number of ongoing migration specific actions to be requested of the target system instance at the specific time is to cause a total number of database operations to be executed on the target system instance; the total number of database operations on the target system instance is to be constrained by the source system instance through limiting a total number of database messages enqueued by the source system instance to a message queue of the target system instance no more than the concurrency limit.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
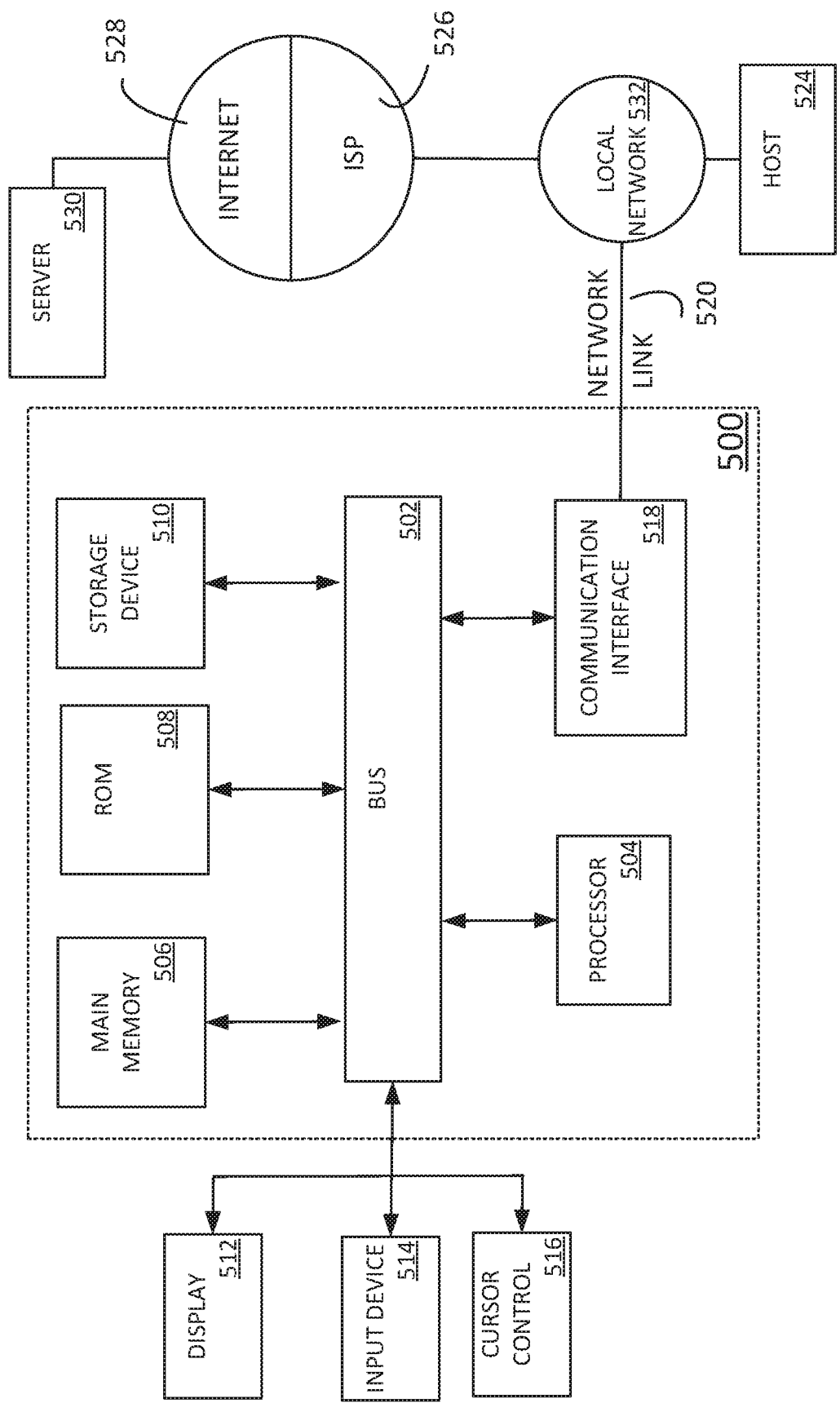
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
sending, from a source system instance of a computing system to a target system instance of the computing system, a set of migration specific action requests to perform a set of migration specific actions;
receiving, from the target system instance before a specific time, a set of migration specific action responses that are responsive to the set of migration specific action requests to perform the set of migration specific actions;
based on the set of migration specific action responses, determining a sequence of traffic lights for resource utilization of the target system instance;
based at least in part on the sequence of traffic lights, determining a concurrency limit for the specific time;
applying the concurrency limit to scale a total number of ongoing migration specific actions to be requested of the target system instance at the specific time.

2. The method as recited in claim 1, wherein a previous concurrency limit that was applied before the specific time is reduced by a first number to generate the concurrency limit for the specific time in response to determining that the sequence of traffic lights represents a sequence of red traffic lights, wherein the previous concurrency limit is increased by a second number to generate the concurrency limit for the specific time in response to determining that the sequence of traffic lights represents a sequence of yellow traffic lights, wherein the previous concurrency limit is increased by a third number greater than the second number to generate the concurrency limit for the specific time in response to determining that the sequence of traffic lights represents a sequence of green traffic lights.

3. The method as recited in claim 1, wherein the set of migration specific action requests are sent to the target system instance by a plurality of migration application servers running on the source system instance; wherein the sequence of traffic lights is collected from the target system instance by the plurality of migration application servers running on the source system instance; wherein the sequence of traffic lights as collected by the plurality of migration application servers running on the source system instance are shared among the plurality of migration application servers running on the source system instance.

4. The method as recited in claim 3, wherein the set of migration specific action requests to perform the set of migration specific actions are sent to a plurality of migration application servers running on the target system instance for execution; wherein the sequence of traffic lights is sent by the plurality of migration application servers running on the target system instance to the plurality of migration application servers running on the source system instance; wherein the sequence of traffic lights as sent by the plurality of migration application servers running on the target system instance are shared among the plurality of migration application servers running on the target system instance.

5. The method as recited in claim 1, wherein the sequence of traffic lights represents one of: a plurality of consecutively received traffic lights by the source system instance from the target system instance, or a majority of received traffic lights by the source system instance from the target system instance.

6. The method as recited in claim 1, wherein the target system instance comprises a plurality of database nodes; wherein the sequence of traffic lights relates to consuming node-level resources at a specific database node in the plurality of database nodes on the target system instance; the method further comprising: based at least in part on the sequence of traffic lights, applying a node-level control algorithm to determine the concurrency limit as a node-level concurrency limit for the specific database node.

7. The method as recited in claim 1, wherein the target system instance comprises a plurality of database nodes; wherein the sequence of traffic lights relates to consuming instance-level resources on the target system instance; the method further comprising: based at least in part on the sequence of traffic lights, applying an instance-level control algorithm to determine the concurrency limit as an overall instance-level concurrency limit for the target system instance.

8. The method as recited in claim 1, wherein the total number of ongoing migration specific actions to be requested of the target system instance at the specific time is to cause a total number of database operations to be executed on the target system instance, wherein the total number of database operations on the target system instance is to be constrained by the source system instance through limiting a total number of database messages enqueued by the source system instance to a message queue of the target system instance no more than the concurrency limit.

9. One or more non-transitory computer readable media storing a program of instructions that is executable by a device to perform:
  sending, from a source system instance of a computing system to a target system instance of the computing system, a set of migration specific action requests to perform a set of migration specific actions;
  receiving, from the target system instance before a specific time, a set of migration specific action responses that are responsive to the set of migration specific action requests to perform the set of migration specific actions;
  based on the set of migration specific action responses, determining a sequence of traffic lights for resource utilization of the target system instance;
  based at least in part on the sequence of traffic lights, determining a concurrency limit for the specific time;
  applying the concurrency limit to scale a total number of ongoing migration specific actions to be requested of the target system instance at the specific time.

10. The media as recited in claim 9, wherein a previous concurrency limit that was applied before the specific time is reduced by a first number to generate the concurrency limit for the specific time in response to determining that the sequence of traffic lights represents a sequence of red traffic lights, wherein the previous concurrency limit is increased by a second number to generate the concurrency limit for the specific time in response to determining that the sequence of traffic lights represents a sequence of yellow traffic lights, wherein the previous concurrency limit is increased by a third number greater than the second number to generate the concurrency limit for the specific time in response to determining that the sequence of traffic lights represents a sequence of green traffic lights.

11. The media as recited in claim 9, wherein the set of migration specific action requests are sent to the target system instance by a plurality of migration application servers running on the source system instance; wherein the sequence of traffic lights is collected from the target system instance by the plurality of migration application servers running on the source system instance; wherein the sequence of traffic lights as collected by the plurality of migration application servers running on the source system instance are shared among the plurality of migration application servers running on the source system instance.

12. The media as recited in claim 11, wherein the set of migration specific action requests to perform the set of migration specific actions are sent to a plurality of migration application servers running on the target system instance for execution; wherein the sequence of traffic lights is sent by the plurality of migration application servers running on the target system instance to the plurality of migration application servers running on the source system instance; wherein the sequence of traffic lights as sent by the plurality of migration application servers running on the target system instance are shared among the plurality of migration application servers running on the target system instance.

13. The media as recited in claim 9, wherein the sequence of traffic lights represents one of: a plurality of consecutively received traffic lights by the source system instance from the target system instance, or a majority of received traffic lights by the source system instance from the target system instance.

14. The media as recited in claim 9, wherein the target system instance comprises a plurality of database nodes; wherein the sequence of traffic lights relates to consuming node-level resources at a specific database node in the plurality of database nodes on the target system instance; the method further comprising: based at least in part on the sequence of traffic lights, applying a node-level control algorithm to determine the concurrency limit as a node-level concurrency limit for the specific database node.

15. The media as recited in claim 9, wherein the target system instance comprises a plurality of database nodes; wherein the sequence of traffic lights relates to consuming instance-level resources on the target system instance; the method further comprising: based at least in part on the sequence of traffic lights, applying an instance-level control algorithm to determine the concurrency limit as an overall instance-level concurrency limit for the target system instance.

16. The media as recited in claim 9, wherein the total number of ongoing migration specific actions to be requested of the target system instance at the specific time is to cause a total number of database operations to be executed on the target system instance, wherein the total number of database operations on the target system instance is to be constrained by the source system instance through limiting a total number of database messages enqueued by the source system instance to a message queue of the target system instance no more than the concurrency limit.

17. A system, comprising:
  one or more computing processors;
  one or more non-transitory computer readable media storing a program of instructions that is executable by the one or more computing processors to perform:
    sending, from a source system instance of a computing system to a target system instance of the computing system, a set of migration specific action requests to perform a set of migration specific actions;

receiving, from the target system instance before a specific time, a set of migration specific action responses that are responsive to the set of migration specific action requests to perform the set of migration specific actions;

based on the set of migration specific action responses, determining a sequence of traffic lights for resource utilization of the target system instance;

based at least in part on the sequence of traffic lights, determining a concurrency limit for the specific time;

applying the concurrency limit to scale a total number of ongoing migration specific actions to be requested of the target system instance at the specific time.

18. The system as recited in claim 17, wherein a previous concurrency limit that was applied before the specific time is reduced by a first number to generate the concurrency limit for the specific time in response to determining that the sequence of traffic lights represents a sequence of red traffic lights, wherein the previous concurrency limit is increased by a second number to generate the concurrency limit for the specific time in response to determining that the sequence of traffic lights represents a sequence of yellow traffic lights, wherein the previous concurrency limit is increased by a third number greater than the second number to generate the concurrency limit for the specific time in response to determining that the sequence of traffic lights represents a sequence of green traffic lights.

19. The system as recited in claim 17, wherein the set of migration specific action requests are sent to the target system instance by a plurality of migration application servers running on the source system instance; wherein the sequence of traffic lights is collected from the target system instance by the plurality of migration application servers running on the source system instance; wherein the sequence of traffic lights as collected by the plurality of migration application servers running on the source system instance are shared among the plurality of migration application servers running on the source system instance.

20. The system as recited in claim 19, wherein the set of migration specific action requests to perform the set of migration specific actions are sent to a plurality of migration application servers running on the target system instance for execution; wherein the sequence of traffic lights is sent by the plurality of migration application servers running on the target system instance to the plurality of migration application servers running on the source system instance; wherein the sequence of traffic lights as sent by the plurality of migration application servers running on the target system instance are shared among the plurality of migration application servers running on the target system instance.

21. The system as recited in claim 17, wherein the sequence of traffic lights represents one of: a plurality of consecutively received traffic lights by the source system instance from the target system instance, or a majority of received traffic lights by the source system instance from the target system instance.

22. The system as recited in claim 17, wherein the target system instance comprises a plurality of database nodes; wherein the sequence of traffic lights relates to consuming node-level resources at a specific database node in the plurality of database nodes on the target system instance; the method further comprising: based at least in part on the sequence of traffic lights, applying a node-level control algorithm to determine the concurrency limit as a node-level concurrency limit for the specific database node.

23. The system as recited in claim 17, wherein the target system instance comprises a plurality of database nodes; wherein the sequence of traffic lights relates to consuming instance-level resources on the target system instance; the method further comprising: based at least in part on the sequence of traffic lights, applying an instance-level control algorithm to determine the concurrency limit as an overall instance-level concurrency limit for the target system instance.

24. The system as recited in claim 17, wherein the total number of ongoing migration specific actions to be requested of the target system instance at the specific time is to cause a total number of database operations to be executed on the target system instance, wherein the total number of database operations on the target system instance is to be constrained by the source system instance through limiting a total number of database messages enqueued by the source system instance to a message queue of the target system instance no more than the concurrency limit.

\* \* \* \* \*